United States Patent
Jiang

(10) Patent No.: US 9,264,363 B2
(45) Date of Patent: Feb. 16, 2016

(54) METHOD, NODE, AND SYSTEM FOR CONTROLLING NETWORK TRAFFIC BASED ON TOKEN RING

(71) Applicant: Huawei Technologies Co., Ltd., Shenzhen (CN)

(72) Inventor: Ying Jiang, Hangzhou (CN)

(73) Assignee: Huawei Technologies Co., Ltd., Shenzhen (CN)

(*) Notice: Subject to any disclaimer, the term of this patent is extended or adjusted under 35 U.S.C. 154(b) by 174 days.

(21) Appl. No.: 14/091,646

(22) Filed: Nov. 27, 2013

(65) Prior Publication Data

US 2014/0086059 A1    Mar. 27, 2014

Related U.S. Application Data

(63) Continuation of application No. PCT/CN2012/080599, filed on Aug. 27, 2012.

(30) Foreign Application Priority Data

Aug. 26, 2011  (CN) .......................... 2011 1 0248171

(51) Int. Cl.
*H04L 12/801* (2013.01)
*H04L 12/433* (2006.01)

(52) U.S. Cl.
CPC .............. *H04L 47/12* (2013.01); *H04L 12/433* (2013.01); *H04L 47/13* (2013.01)

(58) Field of Classification Search
CPC ....... H04L 47/12; H04L 47/781; H04L 47/70; H04L 47/74; H04L 47/748; H04L 47/78
USPC ................................................. 370/235, 236
See application file for complete search history.

(56) References Cited

U.S. PATENT DOCUMENTS 7,369,489 B1    5/2008  Bhattacharya et al.
7,957,292 B2 *  6/2011  Shi et al. ........................ 370/236
(Continued)

FOREIGN PATENT DOCUMENTS

CN        1787483 A       6/2006
CN      101959236 A       1/2011
(Continued)

OTHER PUBLICATIONS

Aisa, J., et al., "The WICKPro Protocol with the Packet Delivery Ratio Metric," Computer Communications 34, XP028301266, 2011, pp. 2047-2056.
Foreign Communication From a Counterpart Application, European Application No. 12827912.2, Extended European Search Report dated Jun. 6, 2014, 6 pages.
(Continued)

*Primary Examiner* — Rasheed Gidado
(74) *Attorney, Agent, or Firm* — Conley Rose, P.C.; Grant Rodolph; Nicholas K. Beaulieu

(57) ABSTRACT

A method for controlling network traffic based on a token ring includes: acquiring, by a node that obtains a token, network congestion situation information carried in the token, where the network congestion situation information includes the total number of to-be-retransmitted messages requested by nodes in a current token passing period; comparing the total number of to-be-retransmitted messages requested by the nodes in the current token passing period with a congestion threshold; determining according to a comparison result, the number of messages that can be transmitted; and transmitting messages according to the number. Because the total number of to-be-retransmitted messages requested by nodes in a current token passing period is added into a token to reflect a network congestion situation, a node is capable of reducing the number of messages to be transmitted when a network is severely congested, thereby reducing network load and improving cluster availability.

12 Claims, 2 Drawing Sheets

(56) References Cited

U.S. PATENT DOCUMENTS

2006/0133379 A1    6/2006    Krishnan et al.
2010/0246400 A1*    9/2010    Onishi et al. .................. 370/235

FOREIGN PATENT DOCUMENTS

| | | |
|---|---|---|
| CN | 101959245 A | 1/2011 |
| CN | 102065000 A | 5/2011 |
| CN | 102291309 A | 12/2011 |
| EP | 1578048 A2 | 9/2005 |

OTHER PUBLICATIONS

Foreign Communication From a Counterpart Application, Chinese Application No. 201110248171.2, Chinese Search Report dated Jun. 5, 2013, 6 pages.

Foreign Communication From a Counterpart Application, PCT Application No. PCT/CN2012/080599, English Translation of Chinese Search Report dated Nov. 29, 2012, 2 pages.

Foreign Communication From a Counterpart Application, PCT Application No. PCT/CN2012/080599, English Translation of Chinese Written Opinion dated Nov. 29, 2012, 6 pages.

* cited by examiner

METHOD, NODE, AND SYSTEM FOR CONTROLLING NETWORK TRAFFIC BASED ON TOKEN RING

CROSS-REFERENCE TO RELATED APPLICATIONS

This application is a continuation of International Application No. PCT/CN2012/080599, filed on Aug. 27, 2012, which claims priority to Chinese Patent Application No. 201110248171.2, filed on Aug. 26, 2011, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

Embodiments of the present invention relate to the field of network communications technologies, and in particular, to a method, a node, and a system for controlling network traffic based on a token ring.

BACKGROUND

The token single-ring ordering and membership protocol provides a mechanism to submit a message to an upper-layer service in a global and orderly manner within a broadcast domain, so as to ensure the reliability and orderliness of message transferring. On a network that supports the token single-ring ordering and membership protocol, such as a token ring network, a token controls each node to access the token ring network. The token is passed between nodes on the token ring network in an orderly manner. Only a node that has the token is capable of broadcasting a message on the token ring network. Each node receives all messages sent by other nodes within a token passing period and stores the received messages in a receive buffer queue. If the number of messages broadcast by a node is not limited, a node with a relatively slow processing speed on the token ring network may fail to process messages in the receive buffer queue in time, resulting in an overflow of the receive buffer queue. To prevent occurrence of this situation, traffic on the network needs to be controlled.

A method for controlling traffic in the prior art is as follows:

In a token passing period: the total number of messages that all nodes can transmit is specified as N; the maximum number of messages that each node can transmit after it gets a token is specified as M; for a node that transmits more messages, it can be considered to allocate a larger transmission proportion to the node, and the number of messages that the node can transmit by proportion is further specified as $K=[(cbl/backlog) \times N]$, where cbl indicates the number of messages to be transmitted by the node that gets the token, backlog indicates the total number of messages to be transmitted by all nodes, and [ ] indicates rounding down to the nearest integer. After the passing order of the token changes, the token passing period ends.

Accordingly, the number of messages that each node can transmit finally is $X=\min(M, K, N-fcc)$, where fcc indicates the total number of messages that have been transmitted by all nodes that have transmitted messages in the current token passing period.

During the implementation of the present invention, the inventor finds that the prior art has at least the following problems.

When a network is severely congested, a large number of messages may be lost. According to requirements of the token single-ring ordering protocol on message reliability, a node requests retransmission of a lost message. The method for controlling network traffic in the prior art does not consider the situation of network congestion, which results in more and more retransmitted messages, thereby increasing network load. In addition, increasing of retransmitted messages results in an overflow of a retransmission list in a token, and loss of massive messages results in that the messages in the receive buffer queue cannot be submitted in an orderly manner, further resulting in an overflow of the receive buffer queue and lowering cluster availability.

SUMMARY

Embodiments of the present invention provide a method, a node, and a system for controlling network traffic based on a token ring, aiming to address a traffic control problem when a network is congested.

The objective of the present invention is achieved by using the following technical solutions:

An embodiment of the present invention provides a method for controlling network traffic based on a token ring, including: acquiring, by a node that obtains a token, network congestion situation information carried in the token, where the network congestion situation information includes the total number of to-be-retransmitted messages requested by nodes in a current token passing period; comparing, by the node that obtains the token, the total number of to-be-retransmitted messages requested by the nodes in the current token passing period with a congestion threshold; and determining, by the node that obtains the token and according to a comparison result, the number of messages that can be transmitted, and transmitting messages according to the number of messages that can be transmitted.

An embodiment of the present invention provides a token ring node, including: a congestion information receiving module configured to acquire network congestion situation information carried in a token, where the network congestion situation information includes the total number of to-be-retransmitted messages requested by nodes in a current token passing period; and a congestion situation control module configured to compare the total number of to-be-retransmitted messages requested by the nodes in the current token passing period with a congestion threshold, determine, according to a comparison result, the number of messages that can be transmitted, and transmit messages according to the number of messages that can be transmitted.

An embodiment of the present invention provides a system for controlling network traffic based on a token ring, including: a ring network consisting of at least three nodes, where each of the nodes passes a token in a predefined order; and a node that obtains the token configured to acquire network congestion situation information carried in the token, where the network congestion situation information includes the total number of to-be-retransmitted messages requested by the nodes in a current token passing period; compare the total number of to-be-retransmitted messages requested by the nodes in the current token passing period with a congestion threshold; determine, according to a comparison result, the number of messages that can be transmitted; and transmit messages according to the number of messages that can be transmitted.

From the technical solutions provided in the embodiments of the present invention, it can be seen that, in the embodiments of the present invention, because the total number of to-be-retransmitted messages requested by nodes in a current token passing period is added into a token to reflect a network congestion situation, a node that obtains the token is capable of reducing the number of messages to be transmitted when a network is severely congested, thereby relieving network congestion and reducing network load. This avoids an overflow of a retransmission list and an overflow of a receive buffer queue that are caused by a severe network congestion, and improves cluster availability.

BRIEF DESCRIPTION OF THE DRAWINGS

To illustrate the technical solutions in the embodiments of the present invention more clearly, the following briefly introduces the accompanying drawings required for describing the embodiments. The accompanying drawings in the following description show merely some embodiments of the present invention, and persons of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. The described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
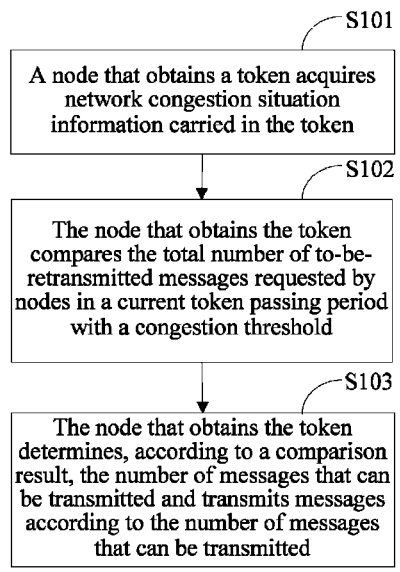
FIG. 1 is a flowchart of a method according to an embodiment of the present invention.

An embodiment of the prevent invention provides a method for controlling network traffic based on a token ring. As shown in FIG. 1, the method specifically includes the following operations:

S101: A node that obtains a token acquires network congestion situation information carried in the token.

The network congestion situation information includes the total number of to-be-retransmitted messages requested by nodes in a current token passing period, used to reflect a network congestion situation.

S102: The node that obtains the token compares the total number of to-be-retransmitted messages requested by the nodes in the current token passing period with a congestion threshold.

The congestion threshold can be determined according to a network congestion test.

S103: The node that obtains the token determines, according to a comparison result, the number of messages that can be transmitted, and transmits messages according to the number of messages that can be transmitted.

In the method provided in this embodiment of the present invention, because the total number of to-be-retransmitted messages requested by the nodes in the current token passing period is added into the token to reflect the network congestion situation, the node that obtains the token is capable of reducing the number of messages to be transmitted when the network is severely congested, thereby relieving network congestion and reducing network load. This avoids an overflow of a retransmission list and an overflow of a receive buffer queue that are caused by a severe network congestion, and improves cluster availability.

A specific implementation manner of S103 may be as follows:

If the total number of to-be-retransmitted messages requested by the nodes in the current token passing period is less than the congestion threshold, the node that obtains the token transmits messages according to a determined first number of messages that can be transmitted. If the total number of to-be-retransmitted messages requested by the nodes in the current token passing period is greater than or equal to the congestion threshold, the node that obtains the token transmits messages according to a determined second number of messages that can be transmitted.

Another specific implementation manner of S103 may be as follows:

If the total number of to-be-retransmitted messages requested by the nodes in the current token passing period is less than or equal to the congestion threshold, the node that obtains the token transmits messages according to a determined first number of messages that can be transmitted. If the total number of to-be-retransmitted messages requested by the nodes in the current token passing period is greater than the congestion threshold, the node that obtains the token transmits messages according to a determined second number of messages that can be transmitted.

The first number of messages that can be transmitted is min (M, K, N-fcc).

The second number of messages that can be transmitted is determined by the network congestion situation information and the first number of messages that can be transmitted, and the second number of messages that can be transmitted is less than the first number of messages that can be transmitted.

In this embodiment of the present invention, there is further the times of congestion occurrences that is determined according to the network congestion situation. Two specific implementation manners of the times of congestion occurrences may be available: (1) The times of congestion occurrences is configured on each node on a token ring network; the times of congestion occurrences refers to the number of consecutive times the total number of to-be-retransmitted messages requested by the nodes is greater than or equal to (or greater than) the congestion threshold in the current token passing period, where an initial value of the times of congestion occurrences is 0. (2) The network congestion situation information may further include the times of congestion occurrences. Accordingly, the second number of messages that can be $$\text{transmitted} = \left[ N \times \frac{1}{2^M} \right],$$

or the second number of messages that can be $$\text{transmitted} = N \times \frac{1}{2^M} + 1,$$

wherein N is the first number of messages that can be transmitted, M is the times of congestion occurrences. From the formula, it can be seen that the second number of messages that can be transmitted decreases geometrically as the times of congestion occurrences increases, thereby effectively controlling message traffic on a network when the network is congested. It should be pointed out that, the above provided is an exemplary method for determining the second number of messages that can be transmitted, and there may further be other methods for determining the second number of messages that can be transmitted as long as the second number of messages that can be transmitted decreases as the network congestion situation becomes severer.

In this embodiment of the present invention, a process for updating the network congestion situation information carried in the token is further included, where the process is specifically as follows: (1) the node that obtains the token determines, according to a local receive buffer queue, the number of messages that are locally requested to be retransmitted, and updates, according to the number of messages that are locally requested to be retransmitted, the total number of to-be-retransmitted messages requested by the nodes in the current token passing period, where: the total number of to-be-retransmitted messages requested by the nodes in the current token passing period=the total number of messages that are requested to be retransmitted taken out from the token + the current number of to-be-retransmitted messages requested by the node that obtains the token − the last number of to-be-retransmitted messages requested by the node that obtains the token; and (2) according to the determination result, if the total number of to-be-retransmitted messages requested by the nodes in the current token passing period is less than the congestion threshold and the times of congestion occurrences is not 0, the node that obtains the token resets the times of congestion occurrences to 0; if the total number of to-be-retransmitted messages requested by the nodes in the current token passing period is greater than or equal to the congestion threshold, the node that obtains the token increases the times of congestion occurrences by 1.

The following details a specific implementation manner of this embodiment of the present invention in a practical application process.

Figure 2:
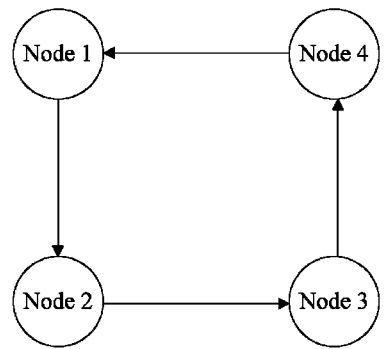
FIG. 2 is a schematic diagram of a token ring network according to an embodiment of the present invention.

One application embodiment is as follows:

On a network shown in FIG. 2, a token is passed in an order of node 1→node 2→node 3→node 4→node 1 on the ring network. The token carries at least the following fields: seq and rtr_count, where seq indicates a globally unique message number, rtr_count indicates the total number of to-be-retransmitted messages requested by nodes in a current token passing period, and an initial value of rtr_count is 0. A congestion threshold H and the times of congestion occurrences C are configured on each node, where the initial value of C is 0. In this embodiment of the present invention, it is assumed that the congestion threshold H for each node is the same.

An implementation manner of controlling network traffic by using a method provided in this embodiment of the present invention includes the following operations:

S201: Node 1 passes the token to node 2, where in the token, seq=100 and an initial value of rtr_count is 0.

S202: After obtaining the token, node 2 acquires the value of rtr_count in the token and compares the value of rtr_count with H, and because the value of rtr_count is less than H, node 2 determines that the number of messages that can be transmitted is X2=min (M2, K2, N-fcc), where M2 indicates the maximum number of messages that can be transmitted by node 2, and K2 indicates the number of messages that can be transmitted by node 2 according to a proportion.

S203: Node 2 transmits messages #101 to #110 and changes the value of seq in the token to 110.

The formula according to which node 2 changes the value of seq is: seq=seq+10.

The number of messages that are transmitted by node 2 does not exceed the determined number X2 of messages that can be transmitted.

S204: Node 2 determines that the number of messages that are locally requested to be retransmitted is 2 and changes the value of rtr_count to 2.

A specific implementation manner in which node 2 determines the number of messages that are locally requested to be retransmitted is 2 is as follows: because seq is 100, messages #1 to #100 are supposed to be saved in a receive buffer queue of node 2; according to an orderliness requirement, node 2 checks the local receive buffer queue and finds that messages #81 and #82 are not received, and therefore determines that the number of messages that are locally requested to be transmitted is 2.

S205: Node 2 passes the token to node 3, where in the token, seq=110 and rtr_count=2.

S206: After obtaining the token, node 3 acquires the value of rtr_count in the token and compares the value of rtr_count with H; it is assumed that the value of rtr_count is less than H, and then node 3 determines that the number of messages that can be transmitted is X3=min (M3, K3, N-fcc), where M3 indicates the maximum number of messages that can be transmitted by node 3, and K3 indicates the number of messages that can be transmitted by node 3 according to a proportion.

S207: Node 3 transmits messages #111 to #120 and changes the value of seq in the token to 120.

The formula according to which node 3 changes the value of seq is: seq=seq+10.

The number of messages that are transmitted by node 3 does not exceed the determined number X3 of messages that can be transmitted.

S208: Node 3 determines that the number of messages that are locally requested to be retransmitted is 1 and changes the value of rtr_count to 3.

A specific implementation manner in which node 3 determines the number of messages that are locally requested to be retransmitted is 1 is as follows: because seq is 110, messages #1 to #110 are supposed to be saved in a receive buffer queue of node 3; according to an orderliness requirement, node 3 checks the local receive buffer queue and finds that message #85 is not received, and therefore determines that the number of messages that are locally requested to be transmitted is 1.

S209: Node 3 passes the token to node 4, where in the token, seq=120 and rtr_count=3.

S210: After obtaining the token, node 4 acquires the value of rtr_count in the token and compares the value of rtr_count with H; it is assumed that the value of rtr_count is greater than H, and then node 4 determines that the number of messages that can be transmitted is X4=[min (M4, K4, N-fcc)×(½C)], and increases the value of C by 1, where M4 indicates the maximum number of messages that can be transmitted by node 4, and K4 indicates the number of messages that can be transmitted by node 4 according to a proportion.

S211: Node 4 transmits messages #121 to #130 and changes the value of seq in the token to 130.

The formula according to which node 4 changes the value of seq is: seq=seq+10.

The number of messages that are transmitted by node 4 does not exceed the determined number X4 of messages that can be transmitted.

S212: Node 4 determines that the number of messages that are locally requested to be retransmitted is 3 and changes the value of rtr_count to 6.

A specific implementation manner in which node 4 determines the number of messages that are locally requested to be retransmitted is 3 is as follows: because seq is 120, messages #1 to #120 are supposed to be saved in a receive buffer queue of node 4; according to an orderliness requirement, node 4 checks the local receive buffer queue and finds that messages #91, #92, and #93 are not received, and therefore determines that the number of messages that are locally requested to be transmitted is 3.

S213: Node 4 passes the token to node 1, where in the token, seq=130 and rtr_count=6.

The foregoing processing process takes only a segment of token passing in an order of node 1→node 2→node 3→node 4→node 1 within a token passing period as an example to describe the method provided in this embodiment of the present invention. In addition, it is assumed that the last number of to-be-retransmitted messages requested by each node is 0.

Another application embodiment is as follows:

On a network shown in FIG. 2, a token is passed in an order of node 1→node 2→node 3→node 4→node 1 on the ring network. The token carries at least the following fields: seq, rtr_count, and cong_count, where seq indicates a globally unique message number, rtr_count indicates the total number of to-be-retransmitted messages requested by nodes in a current token passing period, an initial value of rtr_count is 0, cong_count indicates the times of congestion occurrences, and an initial value of cong_count is 0. A congestion threshold H is configured on each node. In this embodiment of the present invention, it is assumed that the congestion threshold H for each node is the same.

An implementation manner of controlling network traffic by using a method provided in this embodiment of the present invention includes the following operations:

S301: Node 1 passes the token to node 2, where in the token, seq=100 and an initial value of rtr_count is 0.

S302: After obtaining the token, node 2 acquires the value of rtr_count in the token and compares the value of rtr_count with H, and because the value of rtr_count is less than H, node 2 determines that the number of messages that can be transmitted is X2=min (M2, K2, N-fcc), where M2 indicates the maximum number of messages that can be transmitted by node 2, and K2 indicates the number of messages that can be transmitted by node 2 according to a proportion.

S303: Node 2 transmits messages #101 to #110 and changes the value of seq in the token to 110.

The formula according to which node 2 changes the value of seq is: seq=seq+10.

The number of messages that are transmitted by node 2 does not exceed the determined number X2 of messages that can be transmitted.

S304: Node 2 determines that the number of messages that are locally requested to be retransmitted is 2 and changes the value of rtr_count to 2.

A specific implementation manner in which node 2 determines the number of messages that are locally requested to be retransmitted is 2 is as follows: because seq is 100, messages #1 to #100 are supposed to be saved in a receive buffer queue of node 2; according to an orderliness requirement, node 2 checks the local receive buffer queue and finds that messages #81 and #82 are not received, and therefore determines that the number of messages that are locally requested to be transmitted is 2.

S305: Node 2 passes the token to node 3, where in the token, seq=110 and rtr_count=2.

S306: After obtaining the token, node 3 acquires the value of rtr_count in the token and compares the value of rtr_count with H; it is assumed that the value of rtr_count is less than H, and then node 3 determines that the number of messages that can be transmitted is X3=min (M3, K3, N-fcc), where M3 indicates the maximum number of messages that can be transmitted by node 3, and K3 indicates the number of messages that can be transmitted by node 3 according to a proportion.

S307: Node 3 transmits messages #111 to #120 and changes the value of seq in the token to 120.

The formula according to which node 3 changes the value of seq is: seq=seq+10.

The number of messages that are transmitted by node 3 does not exceed the determined number X3 of messages that can be transmitted.

S308: Node 3 determines that the number of messages that are locally requested to be retransmitted is 1, and changes the value of rtr_count to 3.

A specific implementation manner in which node 3 determines the number of messages that are locally requested to be retransmitted is 1 is as follows: because seq is 110, messages #1 to #110 are supposed to be saved in a receive buffer queue of node 3; according to an orderliness requirement, node 3 checks the local receive buffer queue and finds that message #85 is not received, and therefore determines that the number of messages that are locally requested to be transmitted is 1.

S309: Node 3 passes the token to node 4, where in the token, seq=120 and rtr_count=3.

S310: After obtaining the token, node 4 acquires the value of rtr_count in the token and compares the value of rtr_count with H; it is assumed that the value of rtr_count is greater than H, and then node 4 determines that the number of messages that can be transmitted is X4=min (M4, K4, N-fcc)×(½cong_count), and increases the value of cong_count by 1, where M4 indicates the maximum number of messages that can be transmitted by node 4, and K4 indicates the number of messages that can be transmitted by node 4 according to a proportion.

S311: Node 4 transmits messages #121 to #130 and changes the value of seq in the token to 130.

The formula according to which node 4 changes the value of seq is: seq=seq+10.

The number of messages that are transmitted by node 4 does not exceed the determined number X4 of messages that can be transmitted.

S312: Node 4 determines that the number of messages that are locally requested to be retransmitted is 3 and changes the value of rtr_count to 6.

A specific implementation manner in which node 4 determines the number of messages that are locally requested to be retransmitted is 3 is as follows: because seq is 120, messages #1 to #120 are supposed to be saved in a receive buffer queue of node 4; according to an orderliness requirement, node 4 checks the local receive buffer queue and finds that messages #91, #92, and #93 are not received, and therefore determines that the number of messages that are locally requested to be transmitted is 3.

S313: Node 4 passes the token to node 1, where in the token, seq=130 and rtr_count=6.

The foregoing processing process takes only a segment of token passing in an order of node 1→node 2→node 3→node 4→node 1 within a token passing period as an example to describe the method provided in this embodiment of the present invention. In addition, it is assumed that the last number of to-be-retransmitted messages requested by each node is 0.

All or a part of the steps of the methods in the embodiments may be implemented by a program instructing related hardware. The program may be stored in a computer readable storage medium. When the program is run, the steps of the methods in the embodiments are performed. The storage medium includes any medium that can store program codes, such as a read-only memory (ROM), a random-access memory (RAM), a magnetic disk, or an optical disk.

Figure 3:
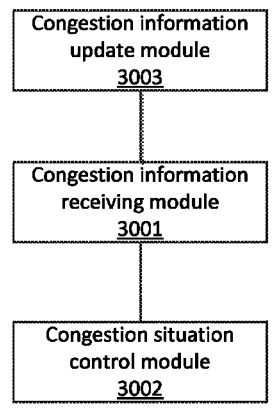
FIG. 3 is a schematic structural diagram of a token ring node according to an embodiment of the present invention.

An embodiment of the present invention further provides a token ring node. A structure of the token ring node is shown in FIG. 3, and a specific implementation structure includes: a congestion information receiving module 3001 configured to acquire network congestion situation information carried in a token, where the network congestion situation information includes the total number of to-be-retransmitted messages requested by nodes in a current token passing period, used to reflecting a network congestion situation; and a congestion situation control module 3002 configured to compare the total number of to-be-retransmitted messages requested by the nodes in the current token passing period with a congestion threshold, determine, according to a comparison result, the number of messages that can be transmitted, and transmit messages according to the number of messages that can be transmitted.

According to the token ring node provided in this embodiment of the present invention, because the total number of to-be-retransmitted messages requested by the nodes in the current token passing period is added into the token to reflect the network congestion situation, a node that obtains the token is capable of reducing the number of messages to be transmitted when the network is severely congested, thereby relieving network congestion and reducing network load. This avoids an overflow of a retransmission list and an overflow of a receive buffer queue that are caused by a severe network congestion, and improves cluster availability.

The congestion situation control module 3002 is specifically configured to: if the total number of to-be-retransmitted messages requested by the nodes in the current token passing period is less than the congestion threshold, transmit messages according to a determined first number of messages that can be transmitted; and if the total number of to-be-retransmitted messages requested by the nodes in the current token passing period is greater than or equal to the congestion threshold, transmit messages according to a determined second number of messages that can be transmitted, where the second number of messages that can be transmitted is determined by the network congestion situation information and the first number of messages that can be transmitted, and the second number of messages that can be transmitted is less than the first number of messages that can be transmitted. Alternatively, the congestion situation control module 3002 is specifically configured to: if the total number of to-be-retransmitted messages requested by the nodes in the current token passing period is less than or equal to the congestion threshold, transmit messages according to a determined first number of messages that can be transmitted; and if the total number of to-be-retransmitted messages requested by the nodes in the current token passing period is greater than the congestion threshold, transmit messages according to a determined second number of messages that can be transmitted.

The token ring node provided in this embodiment of the present invention may further include a congestion information update module 3003 configured to determine, according to a receive buffer queue, the number of messages that are locally requested to be retransmitted, and update, according to the number of messages that are locally requested to be retransmitted, the total number of to-be-retransmitted messages requested by the nodes in the current token passing period.

In this embodiment of the present invention, there is further the times of congestion occurrences that is determined according to the network congestion situation. Two specific implementation manners of the times of congestion occurrences may be available: (1) The times of congestion occurrences is configured on each node on a token ring network; the times of congestion occurrences refers to the number of consecutive times the total number of to-be-retransmitted messages requested by the nodes is greater than or equal to (or greater than) the congestion threshold in the current token passing period, where an initial value of the times of congestion occurrences is 0. (2) The network congestion situation information may further include the times of congestion occurrences, or the times of congestion occurrences is configured on the node that obtains the token. Accordingly, the congestion information update module 3003 is further configured to: if the total number of to-be-retransmitted messages requested by the nodes in the current token passing period is less than the congestion threshold and the times of congestion occurrences is not 0, reset the times of congestion occurrences to 0; and if the total number of to-be-retransmitted messages requested by the nodes in the current token passing period is greater than or equal to the congestion threshold, increase the times of congestion occurrences by 1.

Figure 4:
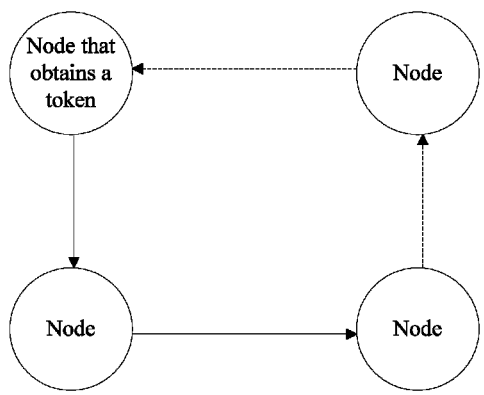
FIG. 4 is a schematic structural diagram of a system according to an embodiment of the present invention.

An embodiment of the present invention further provides a system for controlling network traffic based on a token ring, with its structure being shown in FIG. 4, including: a ring network consisting of at least three nodes, where each of the nodes passes a token in a predefined order; and a node that obtains the token configured to acquire network congestion situation information carried in the token, where the network congestion situation information includes the total number of to-be-retransmitted messages requested by the nodes in a current token passing period; compare the total number of to-be-retransmitted messages requested by the nodes in the current token passing period with a congestion threshold; determine, according to a comparison result, the number of messages that can be transmitted; and transmit messages according to the number of messages that can be transmitted.

According to the system provided in this embodiment of the present invention, because the total number of to-be-retransmitted messages requested by the nodes in the current token passing period is added into the token to reflect the network congestion situation, the node that obtains the token is capable of reducing the number of messages to be transmitted when the network is severely congested, thereby relieving network congestion and reducing network load. This avoids an overflow of a retransmission list and an overflow of a receive buffer queue that are caused by a severe network congestion, and improves cluster availability.

The node that obtains the token is specifically configured to: if the total number of to-be-retransmitted messages requested by the nodes in the current token passing period is less than the congestion threshold, transmit messages according to a determined first number of messages that can be transmitted; and if the total number of to-be-retransmitted messages requested by the nodes in the current token passing period is greater than or equal to the congestion threshold, transmit messages according to a determined second number of messages that can be transmitted, where the second number of messages that can be transmitted is determined by the network congestion situation information and the first number of messages that can be transmitted, and the second number of messages that can be transmitted is less than the first number of messages that can be transmitted.

The node that obtains the token is further configured to: determine, according to a local receive buffer queue, the number of messages that are locally requested to be retransmitted, and update, according to the number of messages that are locally requested to be retransmitted, the total number of to-be-retransmitted messages requested by the nodes in the current token passing period.

The network congestion situation information further includes the times of congestion occurrences, or the times of congestion occurrences is configured on the node that obtains the token; the node that obtains the token is further configured to: if the total number of to-be-retransmitted messages requested by the nodes in the current token passing period is less than the congestion threshold and the times of congestion occurrences is not 0, reset the times of congestion occurrences to 0; if the total number of to-be-retransmitted messages requested by the nodes in the current token passing period is greater than or equal to the congestion threshold, increase the times of congestion occurrences by 1.

The foregoing descriptions are merely exemplary embodiments of the present invention, but the protection scope of the present invention is not limited hereto. Any modification or equivalent replacement that can easily occur to persons skilled in the art without departing from the technical scope of the present invention should fall within the protection scope of the present invention. Therefore, the protection scope of the present invention shall be subject to the protection scope of the claims.

What is claimed is:

1. A method for controlling network traffic based on a token ring, comprising:
    acquiring, by a node that obtains a token, network congestion situation information carried in the token, wherein the network congestion situation information comprises the total number of to-be-retransmitted messages requested by nodes in a current token passing period;
    comparing, by the node that obtains the token, a total number of to-be-retransmitted messages requested by the nodes in the current token passing period with a congestion threshold, wherein the congestion threshold is determined according to a network congestion test;
    determining, by the node that obtains the token and according to a comparison result, a number of messages that can be transmitted, wherein the node determines the number of messages that can be transmitted based on whether the total number of to-be-retransmitted messages is less than or greater than or equal to the congestion threshold; and
    transmitting messages according to the number of messages that can be transmitted,
    wherein determining, by the node that obtains the token and according to the comparison result, the number of messages that can be transmitted, comprises:
        when the total number of to-be-retransmitted messages requested by the nodes in the current token passing period is less than the congestion threshold, transmitting, by the node that obtains the token, messages according to a determined first number of messages that can be transmitted, wherein the determined first number of messages that can be transmitted is determined based on a maximum number of messages that each node can transmit after receiving the token and a total number of messages that have been transmitted by all nodes that have transmitted messages in the current token passing period; and
        when the total number of to-be-retransmitted messages requested by the nodes in the current token passing period is greater than or equal to the congestion threshold, transmitting, by the node that obtains the token, messages according to a determined second number of messages that can be transmitted, wherein the second number of messages that can be transmitted is determined by the network congestion situation information and the first number of messages that can be transmitted, and the second number of messages that can be transmitted is less than the first number of messages that can be transmitted.

2. The method according to claim 1, further comprising determining, by the node that obtains the token and according to a local receive buffer queue, the number of messages that are locally requested to be retransmitted, and updating, according to the number of messages that are locally requested to be retransmitted, the total number of to-be-retransmitted messages requested by the nodes in the current token passing period.

3. The method according to claim 1, wherein the network congestion situation information further comprises:
    a number of times of congestion occurrences; and
    the second number of messages that can be $$\text{transmitted} = N \times \frac{1}{2^M},$$

or the second number of messages that can be $$\text{transmitted} = N \times \frac{1}{2^M} + 1,$$

wherein N is the first number of messages that can be transmitted, and wherein M is the times of congestion occurrences.

4. The method according to claim 1, wherein a times of congestion occurrences is configured on the node that obtains the token, wherein the second number of messages that can be $$\text{transmitted} = N \times \frac{1}{2^M},$$

or the second number of messages that can be $$\text{transmitted} = N \times \frac{1}{2^M} + 1,$$

wherein N is the first number of messages that can be transmitted, and wherein M is the times of congestion occurrences.

5. The method according to claim 3, further comprising:
    when the total number of to-be-retransmitted messages requested by the nodes in the current token passing period is less than the congestion threshold and the times of congestion occurrences is not zero, resetting, by the node that obtains the token, the times of congestion occurrences to zero; and
    when the total number of to-be-retransmitted messages requested by the nodes in the current token passing period is greater than or equal to the congestion threshold, increasing, by the node that obtains the token, the times of congestion occurrences by one.

6. The method according to claim 4, further comprising:
when the total number of to-be-retransmitted messages requested by the nodes in the current token passing period is less than the congestion threshold and the times of congestion occurrences is not zero, resetting, by the node that obtains the token, the times of congestion occurrences to zero; and
when the total number of to-be-retransmitted messages requested by the nodes in the current token passing period is greater than or equal to the congestion threshold, increasing, by the node that obtains the token, the times of congestion occurrences by one.

7. A token ring node, comprising:
a computer processor configured to:
acquire network congestion situation information carried in a token, wherein the network congestion situation information comprises a total number of to-be-retransmitted messages requested by nodes in a current token passing period; and
compare the total number of to-be-retransmitted messages requested by the nodes in the current token passing period with a congestion threshold, determine, according to a comparison result, a number of messages that can be transmitted, and transmit messages according to the number of messages that can be transmitted, wherein the congestion threshold is determined according to a network congestion test, and wherein the number of messages that can be transmitted is determined based on whether the total number of to-be-retransmitted messages is less than or greater than or equal to the congestion threshold;
when the total number of to-be-retransmitted messages requested by the nodes in the current token passing period is less than the congestion threshold, transmit messages according to a determined first number of messages that can be transmitted, wherein the determined first number of messages that can be transmitted is determined based on a maximum number of messages that each node can transmit after receiving the token and a total number of messages that have been transmitted by all nodes that have transmitted messages in the current token passing period; and
when the total number of to-be-retransmitted messages requested by the nodes in the current token passing period is greater than or equal to the congestion threshold, transmit messages according to a determined second number of messages that can be transmitted,
wherein the second number of messages that can be transmitted is determined by the network congestion situation information and the first number of messages that can be transmitted, and
wherein the second number of messages that can be transmitted is less than the first number of messages that can be transmitted.

8. The token ring node according to claim 7, wherein the computer processor is configured to determine, according to a local receive buffer queue, the number of messages that are locally requested to be retransmitted, and update, according to the number of messages that are locally requested to be retransmitted, the total number of to-be-retransmitted messages requested by the nodes in the current token passing period.

9. A token ring node, comprising:
a computer processor configured to:
acquire network congestion situation information carried in a token, wherein the network congestion situation information comprises a total number of to-be-retransmitted messages requested by nodes in a current token passing period; and
compare the total number of to-be-retransmitted messages requested by the nodes in the current token passing period with a congestion threshold, determine, according to a comparison result, a number of messages that can be transmitted, and transmit messages according to the number of messages that can be transmitted, wherein the congestion threshold is determined according to a network congestion test, and wherein the number of messages that can be transmitted is determined based on whether the total number of to-be-retransmitted messages is less than or greater than or equal to the congestion threshold,
wherein the network congestion situation information further comprises the times of congestion occurrences, or the times of congestion occurrences is configured on a node that obtains the token, and
wherein the computer processor is further configured to:
when the total number of to-be-retransmitted messages requested by the nodes in the current token passing period is less than the congestion threshold and the times of congestion occurrences is not zero, reset the times of congestion occurrences to zero; and
when the total number of to-be-retransmitted messages requested by the nodes in the current token passing period is greater than or equal to the congestion threshold, increase the times of congestion occurrences by one.

10. A system for controlling network traffic based on a token ring, comprising:
a ring network consisting of at least three nodes, wherein each of the nodes passes a token in a predefined order; and
a node that obtains the token configured to:
acquire network congestion situation information carried in the token, wherein the network congestion situation information comprises a total number of to-be-retransmitted messages requested by the nodes in a current token passing period;
compare the total number of to-be-retransmitted messages requested by the nodes in the current token passing period with a congestion threshold, wherein the congestion threshold is determined according to a network congestion test;
determine, according to a comparison result, a number of messages that can be transmitted, wherein the number of messages that can be transmitted is determined based on whether the total number of to-be-retransmitted messages is less than or greater than or equal to the congestion threshold; and
transmit messages according to the number of messages that can be transmitted,
wherein the node that obtains the token is configured to:
when the total number of to-be-retransmitted messages requested by the nodes in the current token passing period is less than the congestion threshold, transmit messages according to a determined first number of messages that can be transmitted, wherein the determined first number of messages that can be transmitted is determined based on a maximum number of messages that each node can transmit after receiving the token and a total number of messages that have been transmitted by all nodes that have transmitted messages in the current token passing period; and when the total number of to-be-retransmitted messages requested by the nodes in the current token passing period is greater than or equal to the congestion threshold, transmit messages according to a determined second number of messages that can be transmitted, wherein the second number of messages that can be transmitted is determined by the network congestion situation information and the first number of messages that can be transmitted, and wherein the second number of messages that can be transmitted is less than the first number of messages that can be transmitted.

11. The system according to claim 10, wherein the node that obtains the token is further configured to determine, according to a local receive buffer queue, the number of messages that are locally requested to be retransmitted, and update, according to the number of messages that are locally requested to be retransmitted, the total number of to-be-retransmitted messages requested by the nodes in the current token passing period.

12. A system for controlling network traffic based on a token ring, comprising:

a ring network consisting of at least three nodes, wherein each of the nodes passes a token in a predefined order; and a node that obtains the token configured to:

acquire network congestion situation information carried in the token, wherein the network congestion situation information comprises a total number of to-be-retransmitted messages requested by the nodes in a current token passing period;

compare the total number of to-be-retransmitted messages requested by the nodes in the current token passing period with a congestion threshold, wherein the congestion threshold is determined according to a network congestion test;

determine, according to a comparison result, a number of messages that can be transmitted, wherein the number of messages that can be transmitted is determined based on whether the total number of to-be-retransmitted messages is less than or greater than or equal to the congestion threshold; and transmit messages according to the number of messages that can be transmitted, wherein the network congestion situation information further comprises the times of congestion occurrences, or the times of congestion occurrences is configured on the node that obtains the token, and wherein the node is further configured to:

when the total number of to-be-retransmitted messages requested by the nodes in the current token passing period is less than the congestion threshold and the times of congestion occurrences is not zero, reset the times of congestion occurrences to zero; and when the total number of to-be-retransmitted messages requested by the nodes in the current token passing period is greater than or equal to the congestion threshold, increase the times of congestion occurrences by one.

* * * * *

UNITED STATES PATENT AND TRADEMARK OFFICE
CERTIFICATE OF CORRECTION

PATENT NO. : 9,264,363 B2  
APPLICATION NO. : 14/091646  
DATED : February 16, 2016  
INVENTOR(S) : Jiang Page 1 of 1

It is certified that error appears in the above-identified patent and that said Letters Patent is hereby corrected as shown below:

On the title page item [30] should read:

Aug. 26, 2011   (CN)   ..........................201110248171.2

Signed and Sealed this  
Third Day of May, 2016

Michelle K. Lee  
*Director of the United States Patent and Trademark Office*